United States Patent
Fleming et al.

(10) Patent No.: US 6,622,950 B1
(45) Date of Patent: Sep. 23, 2003

(54) SLOT CONFIGURATION FOR A SEPARATOR WITH SLOTTED WALLS

(75) Inventors: Kent E. Fleming, Layton, UT (US); Thomas C. Goldston, Lehi, UT (US)

(73) Assignee: Weiler and Company, Inc., Whitewater, WI (US)

(*) Notice: Subject to any disclaimer, the term of this patent is extended or adjusted under 35 U.S.C. 154(b) by 0 days.

(21) Appl. No.: 09/909,380

(22) Filed: Jul. 19, 2001

(51) Int. Cl.$^7$ ............................................. B02C 17/16
(52) U.S. Cl. ........................... 241/74; 241/79; 241/82.1
(58) Field of Search ..................... 241/74, 79, 82.1, 241/82.2, 82.3

(56) References Cited

U.S. PATENT DOCUMENTS

| | | | |
|---|---|---|---|
| 1,007,016 A | * 10/1911 | Weir ........................... | 241/74 |
| 4,025,001 A | 5/1977 | Yarem et al. | |
| 4,069,980 A | 1/1978 | Yarem et al. | |
| 4,215,450 A | 8/1980 | Poss | |
| 4,340,184 A | 7/1982 | Poss | |
| 4,561,834 A | 12/1985 | Poss | |
| 4,638,954 A | 1/1987 | Poss | |
| RE33,752 E | 11/1991 | Poss | |
| 5,667,435 A | 9/1997 | Baughman et al. | |
| 5,791,569 A | * 8/1998 | Ishikawa .................... | 241/171 |
| 5,813,909 A | 9/1998 | Goldston | |

* cited by examiner

Primary Examiner—John M. Husar
(74) Attorney, Agent, or Firm—Boyle, Fredrickson, Newholm, Stein & Gratz, S.C.

(57) ABSTRACT

A separating or deboning machine, for separating soft material such as meat from hard material such as bone, includes a separating chamber through which a flighted auger extends. The separating chamber has a series of perforations in a side wall, through which soft material passes upon rotation of the auger. Pressure is maintained within a flow passage defined by the separating chamber, which forces the soft material through the separations to the exterior of the separating chamber. The separating chamber is preferably formed so as to have a parallel-type wall structure, to provide a high throughput of material. The perforations are in the form of specially configured slots which provide low pressure passages for enabling soft material to pass from the flow passage to the exterior of the separating chamber. The slots are inclined in the direction of auger rotation in an upstream-to-downstream direction. In an inward-outward direction, the slots are oriented at a reverse angle of rotation relative to the direction of auger rotation, and in a reverse angle of orientation relative to the direction of material flow through the flow passage. The slots also have outwardly divergent side walls so as to define an increasing slot area in an inward-outward direction.

16 Claims, 3 Drawing Sheets

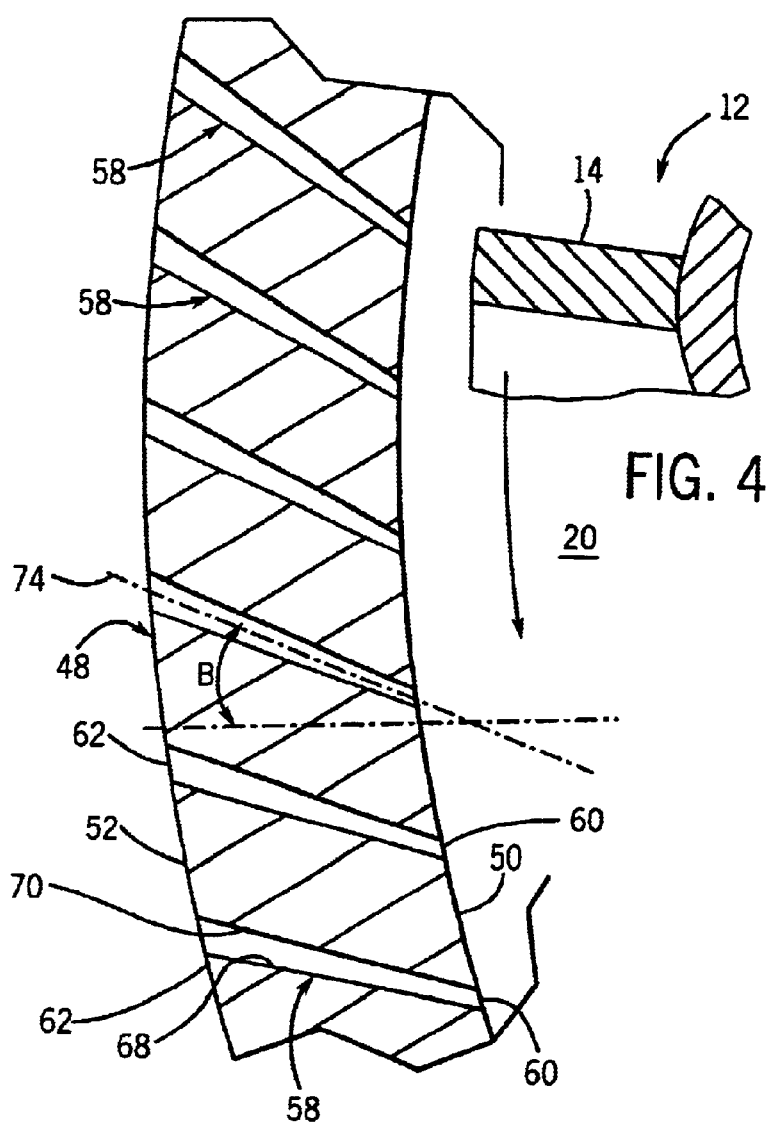
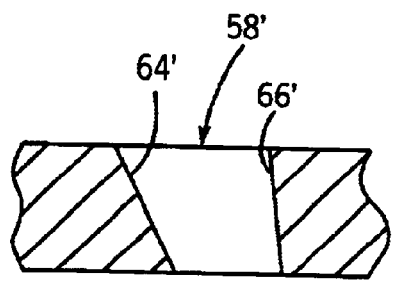
FIG. 4
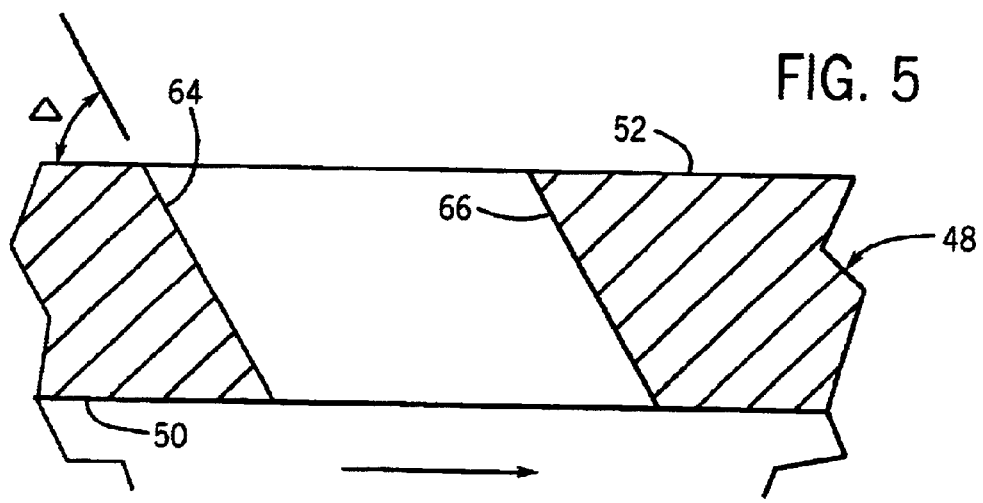
FIG. 6
FIG. 5

SLOT CONFIGURATION FOR A SEPARATOR WITH SLOTTED WALLS

BACKGROUND AND SUMMARY OF THE INVENTION

This invention relates to material processing machines, and more particularly to a material processing machine for separating hard material from soft material, such as separation of muscle tissue in meat products from bone, cartilage or sinew.

Prior art deboning or separating machines typically include a compression type conveyor screw or auger extending through a separating chamber, which typically is in the form of a perforated sleeve or conduit. A combination of hard and soft material is supplied to an inlet end of the machine, such as through a hopper or a pump, and the material passes through the separating chamber under the influence of the rotating auger. The separating chamber includes a series of perforations in its walls, and soft material passes through the perforations while the hard material remains in the separating chamber and is sheared from the soft material by the action of the auger passing over the inlets of the perforations. A restriction is provided at the downstream end of the separating chamber, to create back pressure within the chamber for forcing soft material into and through the perforations. Prior art separating machines of this type are disclosed in U.S. Pat. Nos. 4,189,104 and 5,813,909, the disclosures of which are hereby incorporated by reference.

The '909 patent discloses a separating chamber having an inner wall surface which tapers inwardly in an upstream-to-downstream direction. The perforations in the separating chamber wall are in the form of slots which are angled in the direction of rotation of the auger and which extend at a reverse angle of orientation relative to an upstream-to-downstream direction of flow of the material through the passage of the separating chamber. The auger flighting is tapered so as to correspond to the taper of the inner wall surface of the chamber, and the auger flighting edges are in close proximity to the inner wall surface of the chamber, to provide a shearing action to separate muscle tissue from bone. This type of separating machine has been found to provide a separated muscle product which is relatively coarse and has an improved texture over product obtained using a conventional separator which incorporates parallel walls. However, this type of separator must run at a relatively slow speed of operation, e.g. approximately 200 rpm, in order for proper separation of muscle tissue from hard material to occur.

A typical parallel wall separator incorporates a separating chamber with a straight-sided, non-tapered inner wall surface. The perforations in the separating chamber are in the form of round holes which extend between the inner surface and the outer surface of the separating chamber wall. Soft muscle tissue is essentially "extruded" through the perforations under the influence of pressure within the chamber, and the auger functions to shear off the hard material and to convey the hard material toward a discharge end of the separator. This type of separation provides an end product that has a generally pasty composition which is not suitable for uses which require coarse or textured ground meat. Accordingly, the end product is sold at a price significantly less than that which can be obtained for a coarser grade of ground meat. In this type of separator, the same quality of end product is obtained regardless of the speed of rotation of the auger. Accordingly, the auger is rotated at a relatively fast rate of speed, e.g. approximately 1500 rpm, so as to provide a high output of soft material.

As can thus be appreciated, prior art separating machines are capable of providing either a high output of relatively low grade soft material or a low output of a higher grade of soft material. Known separating machines are not capable of providing a high output of a higher grade of soft material.

It is an object of the present invention to provide a separating machine having a relatively high throughput and which is able to produce a soft tissue product having a coarser texture than can be obtained using prior art high throughput separating machines. It is a further object of the invention to provide such a separating machine which involves a modification to the perforations in the separating chamber, and which otherwise utilizes components which are common to prior art separating machines. It is a further object of the invention to provide a separating chamber for a separating machine, having a unique slot configuration which enables production of a relatively coarse meat product, and which is capable of use in a high throughput application with similar components as are employed in prior art separating machines. Yet another object of the invention is to provide an improvement in a high throughput separating machine, which improves the quality of separated soft material which can be obtained using the machine.

In accordance with the invention, a material processing machine for separating relatively soft material from relatively hard material includes a separating chamber having wall structure which defines a flow passage extending between an upstream end and a downstream end, and a fluted auger located within the separating chamber. The auger rotates in a direction of auger rotation for advancing material from the upstream end of the separating chamber toward the downstream end. The material processing machine further includes a pressurization arrangement which maintains pressure on the material as the material passes through the separating chamber. A series of perforations are formed in the wall structure of the separating chamber. Soft material passes through the perforations as the material is advanced through the separating chamber by the auger. The perforations extend outwardly through the wall structure of the separating chamber, and have a unique configuration which defines a low pressure flow path between the flow passage of the separating chamber and the exterior of the separating chamber. Soft material from within the flow passage travels through the low pressure flow path to the exterior of the separating chamber.

Each perforation is configured so as to have an inlet at the inner surface of the wall structure and an outlet at the outer surface of the wall structure. Each perforation includes an outwardly divergent wall arrangement, such that the inlet has a lesser area than the outlet to provide a restriction at the inlet to the perforation. This construction provides an increasing area for the perforation in an inward-to-outward direction, which serves to define the low pressure flow path for the soft material, to enable the soft material to travel from the flow passage of the separating chamber through the perforations and to the exterior of the separating chamber.

The perforations are preferably in the form of slots which extend generally in the direction of material flow within the flow passage of the separating chamber. The slots are preferably oriented in the direction of rotation of the auger, in an upstream-to-downstream direction. In all other respects, the slots are oriented in a reverse direction relative to the material flow and the direction of auger rotation, to alleviate pressure within the slot and to provide the low pressure flow path for material passing from the internal flow path of the separating chamber to the exterior of the separating chamber.

The invention also contemplates a separating chamber with a slotted perforation configuration as well as an improvement in a separating chamber, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4 is a partial section view taken along line 4—4 of FIG. 3;

FIG. 5 is a partial section view taken along line 5—5 of FIG. 3; and

FIG. 6 is a view similar to FIG. 5, showing an alternative slot end wall configuration.

DETAILED DESCRIPTION OF THE INVENTION

Figure 1:
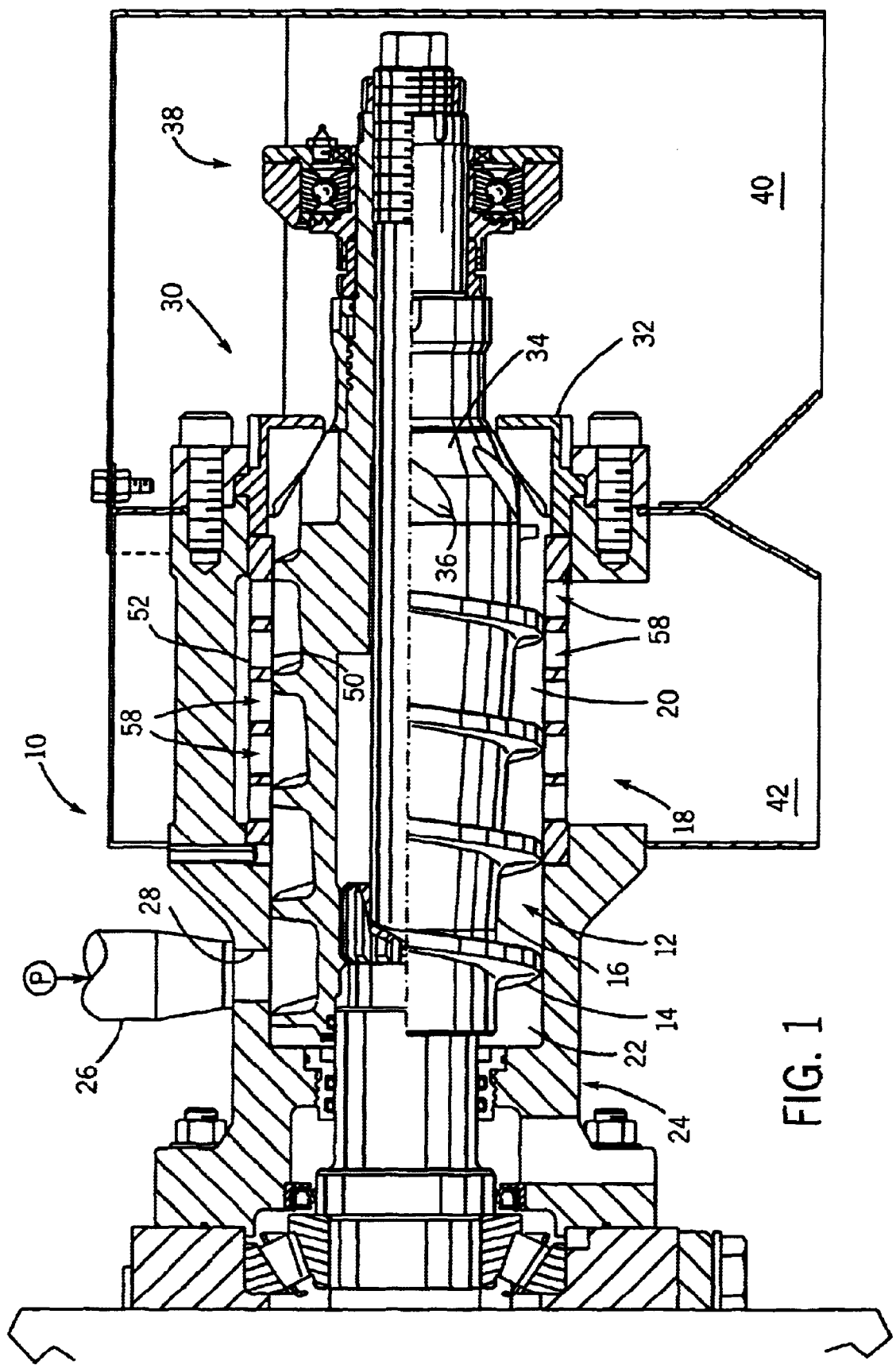
FIG. 1 is a side view, in cross-section, showing a separating machine having a slotted separation chamber in accordance with the present invention.

Referring to FIG. 1, a deboning or separating machine 10 generally includes a screw conveyor or auger 12 with helical flighting 14 extending from a core 16. Flighting 14 defines a constant diameter outer edge throughout its length. Core 16 is tapered outwardly in a downstream direction, so as to define a narrower diameter at the upstream end of separating machine 10 and a larger diameter at the downstream end of separating machine 10. Auger 12 extends through a perforated conduit or separating chamber 18. Separating chamber 18 has a uniform diameter, non-tapered flow passage 20 through which auger 12 extends. At its upstream end, auger 12 is received within an inlet cavity 22 defined by an auger housing 24.

Material such as unboned meat, meat with attached cartilage or sinew, or any other combination of relatively hard material with relatively soft material, is supplied to inlet cavity 22 through a conduit 26 which communicates with inlet cavity 22 through an inlet passage 28 formed in a side wall of auger housing 24. Conduit 26 is interconnected with a pump in a conventional manner, so as to supply the material to inlet cavity 22 under pressure.

In the drawing, conduit 26 is illustrated as being located so as to extend vertically upwardly from auger housing 24. In an actual embodiment, inlet passage 28 is formed in a side of auger housing 24 so as to extend laterally outwardly, although it is understood that material may be supplied to inlet cavity 22 from any location in communication with the upstream end of auger 12.

At a hard material discharge end of separating machine 10, shown generally at 30, a ring valve 32 surrounds a forward extension 34 of auger 12. Ring valve 32 is adjustable in an axial direction, for controlling the size of an annular discharge orifice located between the confronting surfaces of ring valve 32 and forward extension 34. A series of recesses 36 are formed in auger 12 at the interface of ring valve 32 and forward extension 34, for facilitating the discharge of hard material in a known manner.

The downstream end of auger 12 is supported in a bearing assembly 38. A collection area 40 is located below bearing assembly 38. Comminuted bone and other hard material is discharged into collection area 40 after soft material separation, in a manner as is known. A soft material collection area 42 is located below separating chamber 18, for receiving soft material discharged from separating chamber 18 in a manner to be explained.

Referring to FIGS. 2–5, separating chamber 18 includes an upstream mounting ring 44 and a downstream mounting ring 46, which are utilized in a conventional manner to mount separating chamber 18 within separating machine 10. Separating chamber 18 further includes a side wall 48 which extends between upstream mounting ring 44 and downstream mounting ring 46. Side wall 48 defines an inner surface 50 and an outer surface 52. Inner surface 50 functions to form a material flow passage 54 which extends through separating chamber 18.

As shown in the drawings, inner surface 50 of side wall 48 is non-tapered, providing a continuous, constant-diameter configuration of flow passage 20 between its upstream and downstream ends.

A series of slots 58 are formed in separating chamber side wall 48. Slots 58 are formed in zones, shown at $z_1$ through $Z_8$, and occupy substantially the entire length of side wall 48 between mounting rings 44 and 46. Slots 58 in adjacent zones are nested, such that the downstream end of a slot 58 in one zone is located between the upstream ends of a pair of slots 58 in the next downstream zone.

Each slot 58 has a unique configuration which provides a low pressure flow path for material to pass from flow passage 20 to the exterior of separating chamber 18.

Each slot 58 is of generally the same size, shape and configuration, defining an inlet 60 at the intersection of slot 58 with side wall inner surface 50 and an outlet 62 at the intersection of slot 58 with side wall outer surface 52. Each slot 58 further includes an upstream end wall 64, a downstream end wall 66 and a pair of side walls 68, 70. Each slot 58 extends along an axial slot axis 72 (FIG. 3) and a radial slot axis 74 (FIG. 4).

Figure 2:
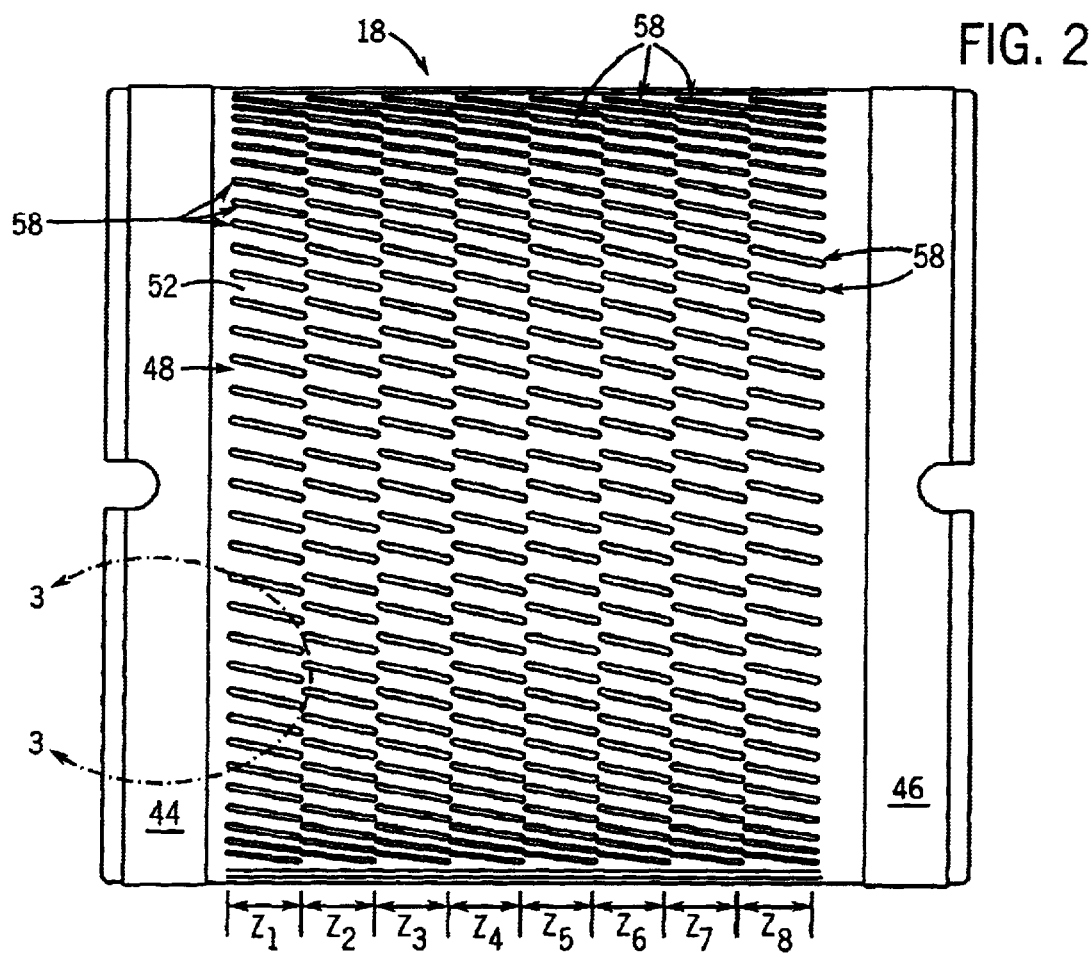
FIG. 2 is a side elevation view of the separating chamber incorporated into the separating machine of FIG. 1.
Figure 3:
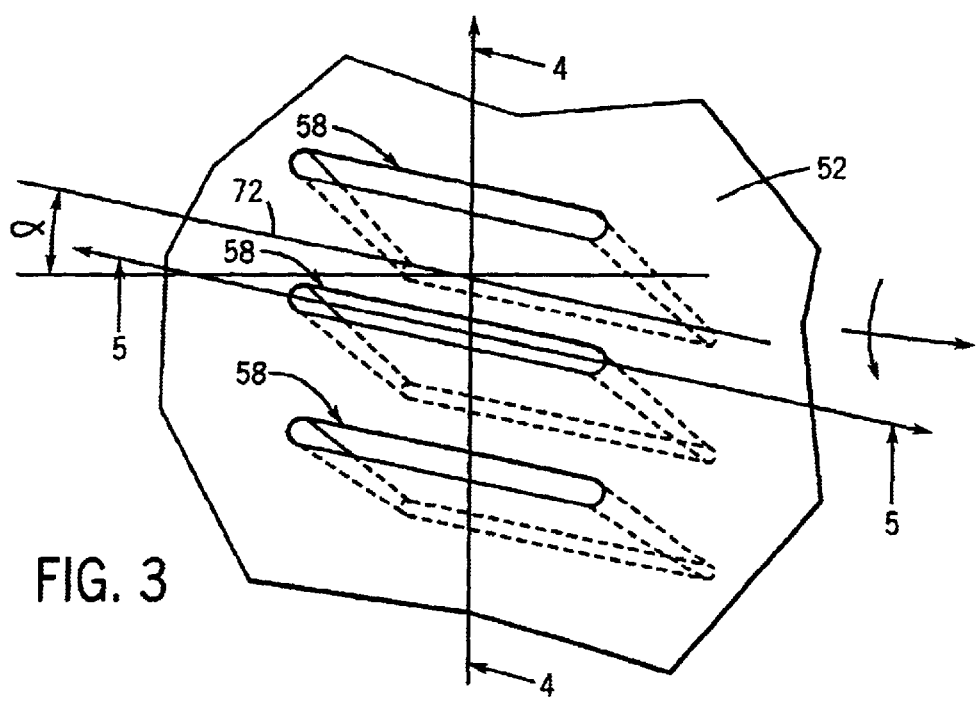
FIG. 3 is an enlarged elevation view illustrating the configuration of slots in the separating chamber of FIG. 2, with reference to line 3—3 of FIG. 2.

Referring to FIGS. 2 and 3, each slot 58 is inclined at an angle α relative to the longitudinal axis of separating chamber 18, in the direction of auger rotation between the upstream and downstream ends of slot 58. Representatively, angle α may be approximately 10°. In addition, the radial slot axis 74 of each slot 58 is oriented at an angle β relative to a radius of chamber inner wall 50, which representatively may be an angle of approximately 30°. The radial slot axis 74 is at a reverse angle relative to the direction of rotation of auger 12. As shown in FIG. 5, slot end walls 64, 66 are parallel and are oriented at an angle A relative to the axial direction of material flow through flow passage 20, which representatively may be approximately 60°. Slot end walls 64 and 66 are again oriented at a reverse angle relative to the direction of material flow through flow passage 20. In an alternative construction, as shown in FIG. 6, a slot 58' may have non-parallel end walls 64', 66', which are divergent in an inward-to-outward direction and which are oriented at different reverse angles relative to the direction of material flow through flow passage 20. Slot side walls 68, 70 are symmetrically divergent in an inward-to-outward direction relative to radial slot axis 74, and define an included angle of approximately 1.7°. While slot side walls 68, 70 are illustrated as symmetrical relative to radial slot axis 74, it is understood that side walls 68, 70 may also be asymmetrical.

In a representative embodiment, separating chamber 18 is formed such that flow passage 20 has a radius of 3 inches, and separating chamber 18 has a wall thickness of ⅜ inches. Slots 58 are formed in side wall 48, such that there are 80 slots in each of zones $z_1$ through $Z_8$. Representatively, each slot 58 may be constructed such that slot inlet 60 has a width of approximately 0.029 inches and slot outlet 62 has a width of approximately 0.050 inches. Slots 58 may each have a length of 0.58 inches, and slots 58 may be radially spaced apart from each other approximately 0.156 inches. These dimensions are intended to be illustrative, and it is understood that any other satisfactory dimensions and angles may be employed.

In operation, separating machine 10 functions as follows to separate relatively soft material from relatively hard material, e.g. muscle tissue from bone, sinew or the like. Initially, raw material is supplied through conduit 26 to inlet cavity 22 by means of a pump, and auger 12 is rotated to advance material from inlet cavity 22 downstream to flow passage 20 defined by separating chamber 18. Ring valve 32 at hard material discharge end 30 is adjusted, in a manner as is known, to provide a desired amount of restriction to the output of hard material from hard material discharge end 30 and to maintain a desired pressure within flow passage 20. Ring valve 32 is typically adjusted so as to provide a pressure of 50–100 psi in flow passage 20. Auger 12 rotates at a speed of approximately 1500 rpm. Flighting 14 of auger 12 is positioned within flow passage 20 such that the flighting ends are spaced slightly inwardly from inner surface 50 of side wall 48. Representatively, the outer edge of flighting 14 is spaced approximately 2 inch inwardly of inner surface 50, although it is understood that the flighting outer edge may be located in closer proximity to or in contact with inner surface 50, or spaced a greater distance inwardly from inner surface 50. Slots 58 provide a low pressure flow path for soft tissue material, such as meat, to exit flow passage 20 to the exterior of separating chamber 18. It has been found that meat muscle material actually seeks out the low pressure areas defined by slots 58 as the material is forced through flow passage 20 by rotation of auger 12, and compresses so as to enable individual meat strands to enter slots 58 through slot inlets 60. Continued rotation of auger 12 within flow passage 20 functions to provide a shearing action at slot inlet 60 so as to separate the hard material, such as bone, from the soft material. The soft material continues its passage through slot 58 to outlet 62 under the influence of pressure within flow passage 20, and decompresses as it travels through slot 58 due to the divergent outward taper of slot side walls 68, 70. The soft material then exits slots 58 through slot outlets 62 to outer surface 52 of separating chamber 18, and is thereafter discharged into collection area 42.

The inclination of each slot 58 in the direction of auger rotation, in an upstream-to-downstream direction, in combination with the reverse slot orientation in an inward-to-outward direction between inner surface 50 and outer surface 52 (both relative to the direction of auger rotation and to the direction of material flow) along with the increasing slot area in an inward-to-outward direction, functions to define a restricted opening low pressure flow path between flow passage 20 and the exterior of separating chamber 18. As discussed, this enables strands or bundles of muscle material to compress and pass into and through slots 58, upon maintenance of proper pressure within flow passage 20 and rotation of auger 12. Simultaneously, auger 12 can be rotated at a relatively high speed, to provide high throughput of material. This provides the dual advantage of high throughput while attaining a relatively coarse texture for the meat material discharged from separating chamber 18, which commands a higher price than the paste-like product attained using prior art high speed separating machines.

While the invention has been shown and described with respect to a particular embodiment, modifications are contemplated as being within the scope of the present invention. For example, while separating chamber side wall 48 is illustrated as straight-sided, providing a constant flow passage area throughout its length, it is also contemplated that other side wall configurations may be employed, e.g. an inward taper in a downstream direction. This construction provides a choke to the flow of material through the separating chamber passage, so as to reduce overall throughput, but is still capable of providing an increased throughput when compared to prior art tapered chamber machines. In addition, the separating chamber 18 is illustrated as having identically configured slots 58 throughout its length. It is contemplated that other slot configurations may be employed in combination with the specifically configured slots 58. Further, while slots 58 are illustrated as being of identical construction in zones $z_1$ through $Z_8$, it is understood that the slots in each zone may have a different size or configuration than the slots in the remaining zones. As noted previously, the slot angles and dimensions are representative, and other satisfactory angles and dimensions may be employed. Further, while slots 58 are illustrated as being in an overlapping, nested relationship from zone to zone, the slots may be positioned in any satisfactory relationship, other than the specific relationship illustrated.

Various alternatives and embodiments are contemplated as being within the scope of the following claims particularly pointing out and distinctly claiming the subject matter regarded as the invention.

We claim:

1. A material processing machine for separating relatively soft material from relatively hard material, comprising:

a separating chamber defining a flow passage extending between an upstream end and a downstream end;

a fluted auger located within the separating chamber, wherein the auger rotates in a direction of auger rotation for advancing material from the upstream end of separating chamber toward the downstream end; and a pressurization arrangement for maintaining pressure on the material as the material passes through the separating chamber;

wherein the separating chamber defines wall structure between the upstream and downstream ends which includes a series of perforations through which the soft material passes as the material is advanced through the separating chamber by the auger, wherein the perforations extend outwardly through the wall structure of the separating chamber and are configured to define a low pressure flow path through which soft material passes from the separating chamber flow passage to the exterior of the separating chamber, wherein the perforations are in the form of slots, wherein each slot extends generally in an upstream-to-downstream direction and defines an upstream end and a downstream end, wherein each slot is oriented at a positive angle of inclination relative to the direction of auger rotation between the upstream and downstream ends of the slot, wherein each slot further defines a radial slot axis, and wherein the radial slot axis is oriented at a reverse angle of inclination relative to the direction of flow of material through the separating chamber and at a reverse angle relative to the direction of auger rotation, wherein each slot includes divergent outwardly tapered slot wall structure that defines an increasing slot opening area in an inward-outward direction in the wall structure of the separating chamber.

2. The material processing machine of claim 1, wherein the wall structure of the separating chamber defines a substantially circular non-tapered flow passage between the upstream and downstream ends.

3. The material processing machine of claim 2, wherein the pressurization arrangement includes a restriction located downstream of the separating chamber, wherein the restriction restricts the discharge of material from the separating chamber for maintaining pressure on the material within the separating chamber.

4. The material processing machine of claim 1, wherein slot defines upstream and downstream end walls, wherein the upstream and downstream end walls are oriented at a reverse angle of inclination relative to the direction of flow of material through the separating chamber.

5. The material processing machine of claim 1, wherein each slot includes a pair of slot side walls in combination with an upstream slot end wall and a downstream slot end wall, wherein the slot side walls are oriented at a reverse angle of orientation relative to the direction of auger rotation.

6. The material processing machine of claim 5, wherein the upstream and downstream end walls are oriented at a reverse angle of inclination relative to the direction of flow of material through the separating chamber.

7. The material processing machine of claim 5, wherein each slot includes divergent outwardly tapered slot side walls which define an increasing slot opening area in an inward-outward direction in the wall structure of the separating chamber.

8. A separating chamber for a material processing machine having a rotating auger, for use in separating relative soft material from relatively hard material, comprising a tubular member having wall structure defining a flow passage extending between an upstream end and a downstream end and adapted to receive the rotating auger, wherein the wall structure includes a series of perforations which extend between an inner surface and an outer surface defined by the wall structure, wherein each perforation defines an increasing cross-sectional area in an inward-to-outward direction between the inner and outer surfaces of the wall structure, wherein the perforations are in the form of slots, wherein each slot extends generally in an upstream-to-downstream direction and defines an upstream end and a downstream end, wherein each slot is oriented at a positive angle of inclination relative to the direction of auger rotation between the upstream and downstream ends of the slot, wherein each slot further defines a radial slot axis, and wherein the radial slot axis is oriented at a reverse angle of inclination relative to the direction of flow of material through the separating chamber and at a reverse angle relative to the direction of auger rotation, wherein each slot includes divergent outwardly tapered slot wall structure that defines an increasing slot opening area in an inward-outward direction in the wall structure of the separating chamber.

9. The separating chamber of claim 8, wherein each slot defines a pair of spaced apart end walls and a pair of spaced apart side walls.

10. The separating chamber of claim 9, wherein the side walls are divergent in an inward-to-outward direction between the inner and outer surfaces of the wall structure so as to provide the increasing cross-sectional area of the perforation.

11. The separating chamber of claim 9, wherein the flow passage extends in an axial direction between the upstream end and the downstream end, and wherein the slots are oriented at an angle relative to the axial direction.

12. The separating chamber of claim 11, wherein each slot extends at a reverse angle relative to the downstream-to-upstream axial direction of the flow path orientation in the direction of auger rotation in an upstream-to-downstream direction, and an angled orientation opposite the axial downstream direction in an inward-to-outward direction, and an orientation opposite the direction of auger rotation in an inward-to-outward direction.

13. In a material processing machine for separating soft material from hard material and including a rotating flighted auger and a separating chamber through which the auger extends, wherein the separating chamber includes wall structure and defines a material flow passage extending between an upstream end and a downstream end, wherein rotation of the auger in a direction of auger rotation is operable to advance material in an axial downstream direction toward the downstream end of the flow passage, wherein the wall structure of the separating chamber includes a series of slots extending between an inner surface and an outer surface of the separating chamber wall structure, wherein soft material passes through the slots upon rotation of the auger, wherein each slot defines a radial slot axis, the improvement comprising the slots having an angled orientation in the direction of auger rotation in an upstream-to-downstream direction, in combination with the radial slot axis having angled orientation opposite the axial downstream direction in an inward-to-outward direction, and an orientation opposite the direction of auger rotation in an inward-to-outward direction.

14. The improvement of claim 13, wherein each slot has outwardly divergent wall structure in an inward-to-outward direction, which defines an increasing area of the slot in an inward-to-outward direction.

15. The improvement of claim 14, wherein each slot includes a pair of spaced apart end walls and a pair of spaced apart side walls, wherein the side walls and the end walls diverge outwardly away from each other in an inward-to-outward direction to define the outwardly divergent wall structure.

16. The improvement of claim 14, wherein the inner surface of the wall structure of the separating chamber defines a substantially straight-sided passage having a substantially constant cross-sectional area between the upstream end and the downstream end of the flow passage.

\* \* \* \* \*

UNITED STATES PATENT AND TRADEMARK OFFICE
CERTIFICATE OF CORRECTION

PATENT NO.    : 6,622,950 B1
DATED         : September 23, 2003
INVENTOR(S)   : Kent E. Fleming et al.

It is certified that error appears in the above-identified patent and that said Letters Patent is hereby corrected as shown below:

Column 7,
Line 22, before "slot" insert -- each --;

Column 8,
Lines 18-23, after "path" delete "orientation in the direction of auger rotation in an upstream-to-downstream direction, and an angled orientation opposite the axial downstream direction in an inward-to-outward direction, and an orientation opposite the direction of auger rotation in an inward-to-outward direction";
Line 41, after "having" insert -- an --;
Line 42, after "direction" delete ",".

Signed and Sealed this

Thirtieth Day of December, 2003

JAMES E. ROGAN
*Director of the United States Patent and Trademark Office*